(12) United States Patent
Elsey et al.

(10) Patent No.: US 6,944,279 B2
(45) Date of Patent: Sep. 13, 2005

(54) ENHANCED DIRECTORY ASSISTANCE SERVICE PROVIDING INDIVIDUAL OR GROUP DIRECTORIES

(75) Inventors: Nicholas J. Elsey, West Linn, OR (US); Michael A. Kepler, Aloha, OR (US); Michael Essex, Tigard, OR (US); John S. Stafford, Portland, OR (US)

(73) Assignee: Metro One Telecommunications, Inc., Beaverton, OR (US)

( * ) Notice: Subject to any disclaimer, the term of this patent is extended or adjusted under 35 U.S.C. 154(b) by 115 days.

(21) Appl. No.: 10/263,021

(22) Filed: Oct. 2, 2002

(65) Prior Publication Data

US 2003/0026405 A1 Feb. 6, 2003

Related U.S. Application Data

(62) Division of application No. 09/441,656, filed on Nov. 12, 1999.

(51) Int. Cl.[7] .......................... H04M 3/00; H04M 3/42; H04M 7/00
(52) U.S. Cl. ........................... 379/218.01; 379/265.01; 379/223
(58) Field of Search .................. 379/218.01, 201.01, 379/223, 265.01

(56) References Cited

U.S. PATENT DOCUMENTS

| | | | |
|---|---|---|---|
| 4,882,474 A | * | 11/1989 | Anderl et al. ............... 235/380 |
| 5,204,894 A | * | 4/1993 | Darden ..................... 379/88.03 |
| 5,239,577 A | | 8/1993 | Bates et al. |
| 5,329,578 A | | 7/1994 | Brennan et al. |
| 5,479,491 A | | 12/1995 | Herrero Garcia et al. |
| 5,574,776 A | * | 11/1996 | Leuca et al. ........... 379/127.01 |
| 5,644,711 A | * | 7/1997 | Murphy ..................... 713/202 |
| 5,835,570 A | | 11/1998 | Wattenbarger |
| 5,913,025 A | | 6/1999 | Higley et al. |
| 5,966,437 A | | 10/1999 | Cox et al. |
| 6,076,093 A | | 6/2000 | Pickering |
| 6,081,898 A | | 6/2000 | Miller et al. |
| 6,134,319 A | | 10/2000 | Burg et al. |
| 6,147,773 A | | 11/2000 | Taylor et al. |
| 6,230,188 B1 | | 5/2001 | Marcus |
| 6,330,308 B1 | * | 12/2001 | Cheston et al. .......... 379/88.04 |
| 6,404,884 B1 | * | 6/2002 | Marwell et al. ....... 379/265.13 |
| 2002/0085702 A1 | * | 7/2002 | Cox et al. ............. 379/218.01 |

OTHER PUBLICATIONS

U.S. Appl. No. 60/158,311.*

* cited by examiner

*Primary Examiner*—Ahmad Matar
*Assistant Examiner*—Hector Agdeppa
(74) *Attorney, Agent, or Firm*—Kaye Scholer LLP

(57) ABSTRACT

Individuals and groups of individuals, such as corporations, are provided access to one or more private directories. The private directories can be edited by an administrator. Access to the private directories may be limited by administrators of the private directories. Access to private directories is provided via a connection to directory assistance providers. Directory service providers are capable of facilitating the administration of the private directories as well as connecting users of private directories to contacts in the private directories. Access to the private directory may be obtained via an internet connection.

22 Claims, 16 Drawing Sheets

SEARCH • CUSTOMER CENTRAL • SITE MAP • CORPORATE • ORDER NOW!

MetroDex

[ Help ] [ Logout ] [ Account Info ] [ My Directories ]

My Directories

Shad Stafford: You belong to 4 MetroDex Directories. The table below shows you the directories you are associated with. Click the View or Edit button to access a directory.

| Name | Owner | Permission | View/Edit | Delete |
|---|---|---|---|---|
| Baseball Team | Alyson Rushforth | Read Only | View | |
| Foobar | Alyson Rushforth | Administrator | View | |
| Qwetry | Shad Stafford | Owner | View | Delete |
| Sales | Tracy | Administrator | View | |
| | | | New Directory | |

Phones & Features
Smart Reasons
Coverage Maps
Go to Your Region
Send PCS Email
Win a Phone!

Home

CARRIER

Phones&Features|SmartReasons|CoverageMaps|GoToYourRegion
SendPCSEmail|WinaPhone|Search|CustomerCentral
SiteMap|CorporateInformation|OrderNow!

Legal Notices Copyright © 1999 Pacific Bell Wireless and Intelligent Information Incorporated All Rights Reserved

FIG. 2

MetroDex Login

Please provide you're username and password. If you do not have an account yet or if you have forgotten your password, use your mobile phone to call Information, the operator there will help you set up your account.

Enter your mobile phone number (10-digit) or username: 5035551212

Password: ☐

[ Login ]

FIG. 3

[ Help ] [ Logout ] [ Account Info ] [ My Directories ]

My Directories: Directory Edit

Updating New Directory Directory

Update directory information

- Name: [New Directory]
- Contact numbers are private: ☐
- Directory Specific Password: [          ]
- Last edit time:
- Last edited by:

[ Change Owner ] [ Save ]

FIG. 6

[ Help ] [ Logout ] [ Account Info ] [ My Directories ]

My Directories: Directory View

Viewing Baseball Team Directory

Directory information

- Name: Baseball Team
- Owner: Alyson Rushforth
- Your access level: Read Only

FIG. 7

| Help | Logout | Account Info | My Directories |

My Directories: Directory Edit

Updating Qwetry Directory

Contacts: There are 18 contacts in this directory

Search by First Name: [          ]    Search by Last Name: [          ]

[ New ] [ View All ] [ Search ]

---

Subscribers: There are 13 people subscribed to this directory

Search by Name [          ]    [ Search ]

Search by Mobile Phone Numbers: [          ]    [ Search ]

[ New ] [ View All ]

---

Update directory information

Name: [Qwetry]

Contact numbers are private: ☐

Directory Specific Password: [          ]

Last edit time: 1999/07/30 14:30:12 PDT

Last edited by: Shad Stafford

[ Change Owner ] [ Save ]

| Help | Logout | Account Info | My Directories |

My Directories: Directory Edit

Directory: New Directory

Transfer directory ownership.

Enter the mobile phone number of the person you want to be the new owner of this directory. This person must already be an administrator of this directory.

Mobile Phone Number: [          ]

[ Cancel ] [ Continue ]

FIG. 9

[ Help ] [ Logout ] [ Account Info ] [ My Directories ]

My Directories: Directory Edit: Contact Select

Directory: Qwetry

Contacts: There are 18 contacts in this directory

Search by First Name: [          ]   Search by Last Name: [          ]

[ New ]   [ View All ]   [ Search ]

| Name | Home | Business | Mobile | |
|------|------|----------|--------|---|
| Monty Burns | (709) 153-2977 | (335) 444-5555 | (503) 555-1234 | Undelete |
| Mr. Ed | (555) 987-4321 | | | Delete |
| Karl Karl | (888) 123-4545 | (888) 123-4545 | (888) 123-4545 | Delete |
| Mary Lamb | (709) 133-2977 | (333) 444-5555 | (503) 555-1234 | Delete |
| Lenny Lenny | (888) 123-9999 | (888) 123-4545 | (888) 123-4545 | Delete |
| Bat Man | (555) 444-6563 | | | Delete |
| Spider Man | (828) 737-6454 | | | Delete |
| Mighty Mouse | (709) 133-2977 | (503) 555-1234 | | Delete |
| Apu Nahasapeemapetalon | (709) 133-2977 | (503) 456-7890 | (503) 555-1234 | Delete |
| Bart Simpson | (709) 133-2977 | (333) 444-5555 | (503) 555-1234 | Delete |
| Now showing records 1-10 of 16 | | | | Next |

FIG. 10

Update Contact Information

First Name: | Middle Name: | Last Name:
Nick | | Elsey

Company Name: Metro One
Company Department: Development
Title: VP Product Development Address 1: 11200 Murray Schools Place
Address 2:
City: Beaverton
State: OR
Postal Code: 97007
Country: USA

[Cancel] [Save & Add] [Save]

| | | | |
|---|---|---|---|
| Home 1 | 5035551234 | x | Private: ☑ |
| Home 2 | | x | Private: ☐ |
| Mobile 1 | 5038079414 | x | Private: ☐ |
| Mobile 2 | | x | Private: ☐ |
| Business 1 | 5036439500 | x | Private: ☐ |
| Business 2 | | x | Private: ☐ |
| Fax 1 | 5036439600 | x | Private: ☐ |
| Fax 2 | | x | Private: ☐ |
| Email 1 | nick@metro1.com | | Private: ☐ |
| Email 2 | | | Private: ☐ |
| Pager 1 | | x | Private: ☐ |
| Pager 2 | | x | Private: ☐ |
| Other 1 | | | Private: ☐ |
| Other 2 | | | Private: ☐ |
| Other 3 | | | Private: ☐ |
| Other 4 | | | Private: ☐ |

[Cancel] [Save & Add] [Save]

FIG. 11

[ Help ] [ Logout ] [ Account Info ] [ My Directories ]

My Directories: Directory Edit: Subscriber Select

Directory: Qwetry

Subscribers: There are 13 people subscribed to this directory

Search by Name [           ]    [Search]

Search by Mobile Phone Numbers: [           ]    [Search]

[New]    [View All]

| Cell Phone Number | name | Access Level | Delete |
|---|---|---|---|
| (503) 233-7966 |  | Read Only | [Delete] |
| (503) 330-5420 | Nick Elsey | Read Only | [Delete] |
| (503) 524-1286 | Shad Stafford | Owner | [Delete] |
| (503) 955-1234 |  | Read Only | [Delete] |
| (541) 344-6342 |  | Administrator | [Delete] |
| (555) 555-1234 | Nancy Leino | Administrator | [Delete] |
| (646) 555-1234 | John Hall | Read Only | [Delete] |
| (787) 555-4321 | Joe Smith | Read Only | [Delete] |
| (828) 555-4321 | Foo Bar | Administrator | [Delete] |
| (971) 444-3232 | Schmedly & Schmedly | Read Only | [Delete] |
|  | Now showing records 1-10 of 13 |  | [Next] |

FIG. 12

[ Help ] [ Logout ] [ Account Info ] [ My Directories ]

My Directories: Directory Edit: Subscriber Select: Subscriber Edit

FIG. 13

Creating Subscriber for Directory: Qwetry

Create a Subscriber

Enter the Mobile Phone Number of the Person that you want to add as a subscriber [           ]. If you need to add an administrator to your directory who doesn't have a mobile phone, you may enter a username for them here.

[Cancel]    [Continue]

Enter Subscriber Information

First name: _____ *

Last name: _____ *

Mobile Phone Number: * (503) 233-7966

Access level: * [Read Only ▾]

[Continue]

[Cancel]

FIG. 14

Logout

Logout

Thankyou for using this service, you are now completely logged out.

If you wish to return to using this service, you must login again.

FIG. 15

ENHANCED DIRECTORY ASSISTANCE SERVICE PROVIDING INDIVIDUAL OR GROUP DIRECTORIES

This application is a division of application Ser. No. 09/441,656 filed on Nov. 12, 1999.

TECHNICAL FIELD

The present invention relates to a system of providing enhanced directory assistance service to users of telecommunications services, including users of telephones (both wireless and wireline), computers and PDAs. In particular, the present invention relates to providing subscribers of telecommunications services access to directory information in their own individual or group private directories.

BACKGROUND

Telephone Directory Assistance

Traditionally, directory assistance has focused on providing telephone number directory information only. Typically, a directory assistance operator receives a request from a caller for the telephone number of a desired party. The operator locates the required number from a listing directory and either supplies the number to the caller or connects the caller to the desired party.

Each year, a growing number of people spend a significant amount of their time traveling for business or pleasure. Mobile communication and portable computers have created an opportunity for these people to conduct business and communicate while away from their homes or places of business. Wireless telephones have become a standard business tool in this environment. However, wireless telephone users may find current directory assistance services inconvenient or difficult to use. Such users are usually away from their general work environments (for example, traveling in a vehicle), and thus may not be able to remember, or make a note of, a desired number. Callers who would normally be able to call upon secretaries or personal assistants at their offices, may not have access to such assistance when traveling thereby not being able to access contact directories etc. The wireless telephone caller thus needs a comparable service to that which they would experience in an office environment. While improvements to telephone directory assistance have been made over the years, such systems do not fully address the needs of wireless telephone users.

The present assignee has also established a country-wide network of directory assistance or call centers that are able to provide customers with nationwide directory assistance.

Private Directories

While private directories for telephone users have existed for some time, such as those disclosed in U.S. Pat. Nos. 5,835,570 and 5,204,894, such systems do not address the needs of wireless telephone subscribers. They do not provide for private individual or private group directories. Furthermore they do not allow for the customization of the directory information by multiple parties and allow listed parties to be selectively reachable while keeping their numbers private.

Existing Personal Information Management software and devices are often used to store private directory information, but are often not convenient or safe tools for providing directory information to mobile telephone users. Corporate employees in many cases must manually synchronize their personal and their corporate directories, and such private directories are often out of date or otherwise inaccurate, consuming what might otherwise be more productive time. Also most existing corporate directory management systems do not facilitate connectivity while keeping contact details, such as employee's home telephone numbers, private.

Therefore, there is a need to provide subscribers more capable private directory services as well as greater connectivity in connection with these private directories services. While these needs exist and are described in the context of a wireless environment, the same problems arise in the wireline environment.

SUMMARY OF THE INVENTION

The present invention is directed to providing a calling party the ability to create, administer, modify, and ultimately access, individual or group private directories. This service is intended for use by, but is not limited to, wireless telephone subscribers. Such services are also relevant to computer and PDA users as well as wireline telephone users.

According to a preferred embodiment of the present invention, the system includes a nationwide wide area network (WAN) connecting a plurality of directory assistance centers to a server and directory listing database located in an information hub. Alternatively, the system may be connected on a public network or a virtual private network.

A plurality of private directories are provided. The private directories may contain contact details or other information for an individual wireless telephone subscriber or for a group of subscribers, such as the employees of a business or the members of an organization. For example, a corporation may keep all employees contact details in a private directory database. The database owner, in our example the corporation, may set up access rights to such information. For example, different levels of access may be set up for different employees, allowing some employees access to the actual contact details, and others only the ability to place calls, without being supplied with the contact details of the party called. Access to the private database directories may be provided to users, administrators, owners and/or operators, with the required access rights, through a web browser interface or the like.

An embodiment of the present invention provides a method whereby a subscriber connects to directory assistance and is connected to a directory assistance service operator. The term "operator" in the present invention is understood to include entities that are capable of providing directory assistance in a telecommunication environment, including without limitation human operators, voice response/recognition capabilities, and web-enabled operator services. Where the subscriber requires access to a private directory database, an authentication process determines the subscriber's private directory access rights. This authentication process is advantageously automated to streamline the access process. Depending on these access rights, an operator may obtain a desired party's contact details and may either furnish these details to the subscriber or connect the subscriber to the desired party. Again, depending on the subscriber's access rights the caller may be permitted to administer a particular private directory.

The present invention also provides easy access to frequently requested numbers that may otherwise be unlisted, or require secrecy. Subscribers may access listings by names that are familiar to them. Companies or other organizations will be able to provide connectivity between employees/members without providing confidential information to the employee/member using the service. Directories may for example contain—personal, family, departmental, corporate, club or other association—contact details.

BRIEF DESCRIPTION OF THE DRAWINGS

The foregoing and additional features and advantages of the present invention will be more readily apparent from the following detailed description, which proceeds with reference to the accompanying drawings.

FIG. 2 illustrates a first graphical user interface of the present invention;

FIG. 3 illustrates a second graphical user interface of the present invention;

FIG. 6 illustrates a fifth graphical user interface of the present invention;

FIG. 7 illustrates a sixth graphical user interface of the present invention;

FIG. 8 illustrates a seventh graphical user interface of the present invention;

FIG. 9 illustrates a eighth graphical user interface of the present invention;

FIG. 10 illustrates a ninth graphical user interface of the present invention;

FIG. 11 illustrates a tenth graphical user interface of the present invention;

FIG. 12 illustrates a eleventh graphical user interface of the present invention;

FIG. 13 illustrates a twelfth graphical user interface of the present invention;

FIG. 14 illustrates a thirteenth graphical user interface of the present invention;

FIG. 15 illustrates a fourteenth graphical user interface of the present invention;

DETAILED DESCRIPTION OF PREFERRED EMBODIMENTS

Figure 1:
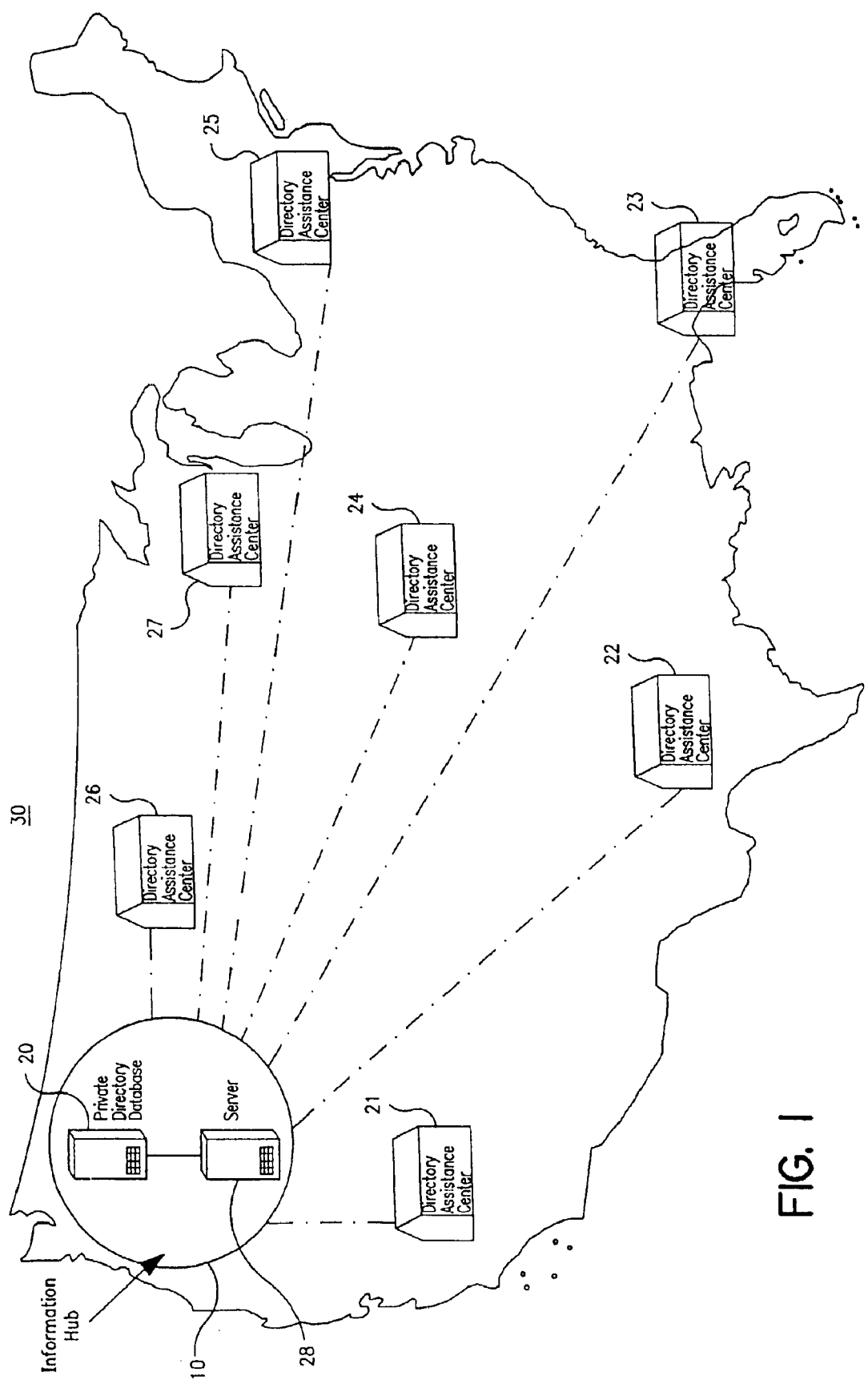
FIG. 1 is a telephonic system according to a preferred embodiment including a wide area network.

As illustrated in FIG. 1, the system according to a preferred embodiment of the present invention includes a wide area network (WAN) 30 covering a wide coverage area. The WAN 30 can be an internet-based network such as the world wide web or can be a private intranet based network. According to a preferred embodiment, the WAN 30 covers an entire region (e.g. the entire eastern seaboard of the United States), an entire country (e.g. the United States) or group of countries (e.g. all of Canada, Mexico and the United States). The WAN 30 connects a plurality of operators dispersed throughout the wide coverage area in a plurality of directory assistance centers 21, 22, 23, 24, 25, 26 and 27. Each of the directory assistance centers 21, 22, 23, 24, 25, 26 and 27 cover one or more regional coverage areas. One or more information hubs 10 are also included in the WAN 30. An information hub 10 contains one or more servers 28 which are accessible by the operators in the system and one or more databases 20 on which a plurality of private directories are stored and maintained. Private directory may also be stored locally at one or more of the plurality of directory assistance centers. Private directories at different centers are synchronized. Synchronized databases provide necessary backup as well as support roaming customers.

As explained in greater detail below, a private directory contains contact information specifically tailored to the needs of an individual or corporation. For example, an individual may want to create two private directories. The first private directory may be established to contain all of the individual's personal contact information and the second private directory may be established to contain all of the individual's business contact information. This individual, whom is referred to as the owner of the private directory, may want to allow his/her spouse access to the personal private directory. The owner of the directory can allow the spouse only the right to view the personal private directory. In this instance, the spouse would be referred to as a "read only" user. Alternatively, the owner may way to allow his/her spouse to add his/her own contact information in the personal database. In this instance, the spouse would also be an administrator of the personal directory.

A corporation may also take advantage of the present invention by keeping the contact information of all of its employees in a private directory database. The database owner, in this example, the corporation, sets up access rights to such information. Again, different levels of access may be set up for different employees. For example, some employees may be provided access to the actual contact details contained in the private database. In contrast, other employees may only have the ability to place calls, without being supplied with the contact details of the party called.

Figure 17A:
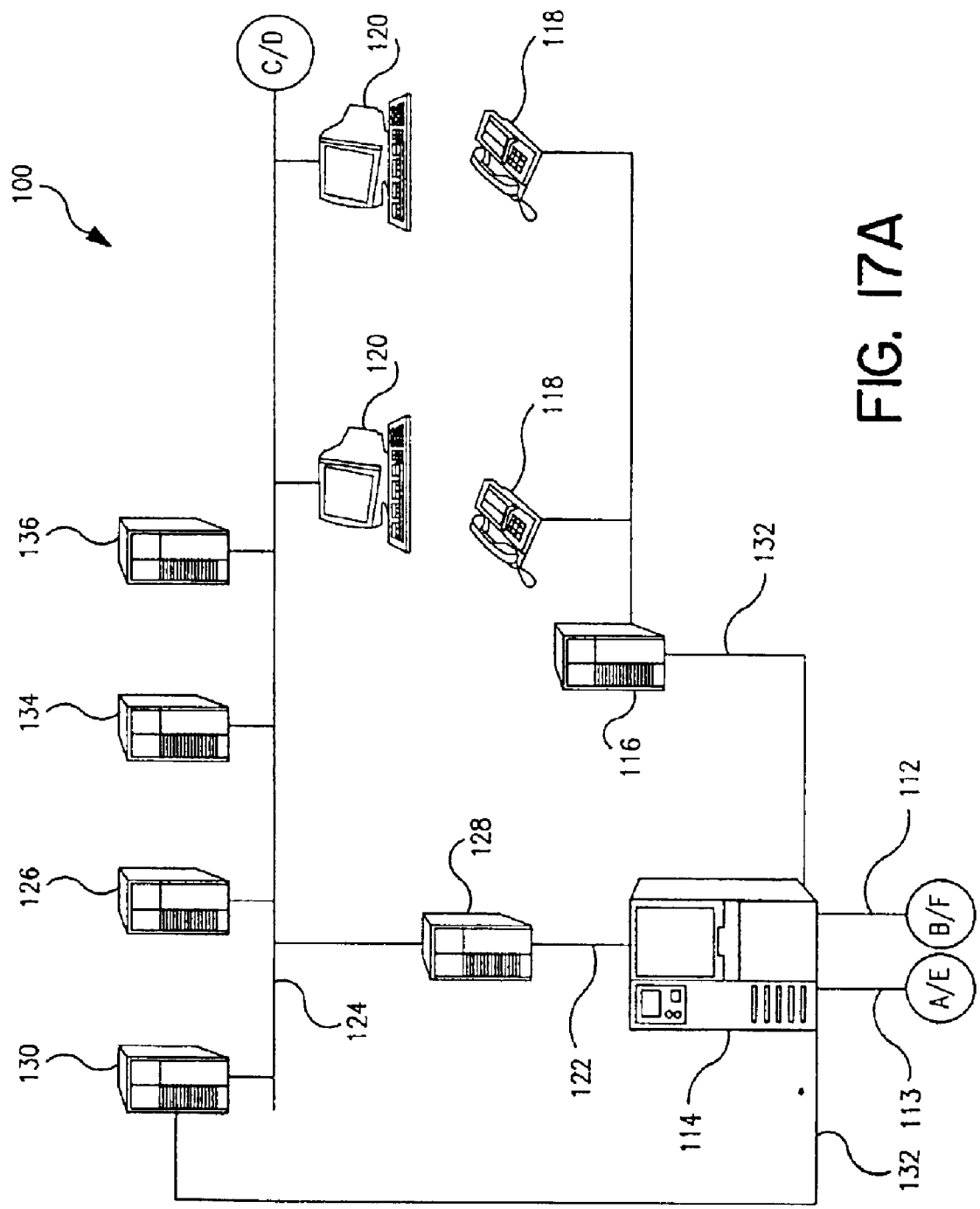
FIGS. 17A and 17B are block diagrams depicting the hardware used to implement an embodiment of the present invention.
Figure 17B:
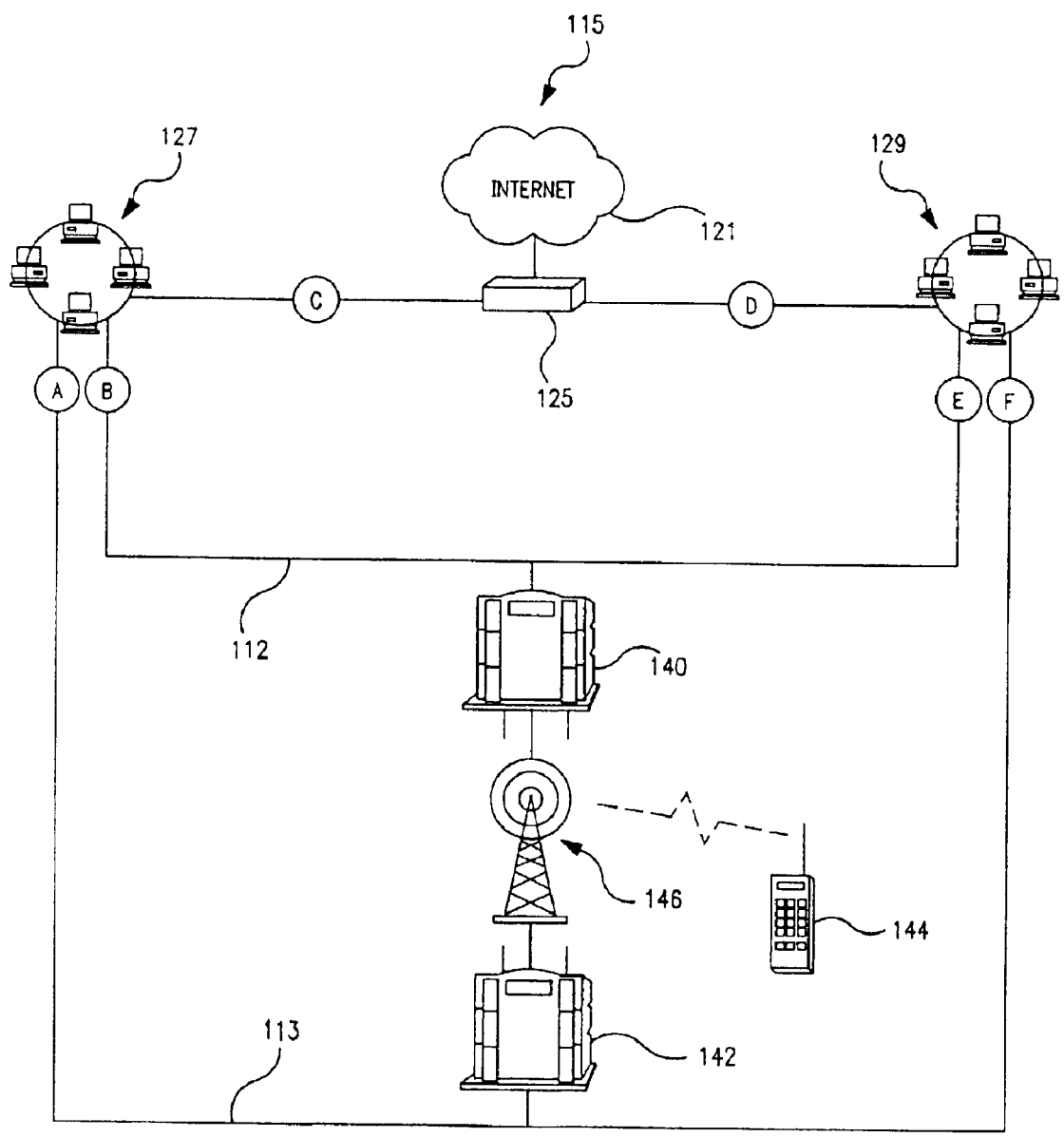

According to a preferred embodiment, a user or subscriber may connect to any private directory to which they have access over the internet. Over the internet, depending on his/her access rights, a user may view, edit, delete, augment or otherwise administer his/her private directory(ies). An advantage of the present invention is the added capability of allowing a user to connect to a private directory by communicating with an operator at a directory assistance center via any telecommunication media—wireless telephone, wireline telephone, voice over IP, personal digital assistance (PDA), computer modem, VPN, etc. The user or subscriber will be connected to an operator (understood to include entities that are capable of providing directory assistance in a telecommunication environment, including without limitation human operators, voice response/recognition capabilities, and web-enabled operator services). The operator, as explained in more detail below in connection with FIGS. 17A and 17B, are generally provided web browser capabilities, telephone facilities as well as fully-featured operator user interface applications which facilitate the searching, retrieval and administering of private directory databases 20. It is well understood that directory assistance operators receive and respond to requests for directory assistance.

A user may be a "read-only" user of a directory. In the instance of a read-only user, the user may view a directory but not,change it. A user may be an "administrator" of directory. An administrator may not only view a directory, but also edit the directory. An administrator may also provision new read-only users as well as restrict previously provisioned read-only users. A user may also be an "owner" of a directory. An owner of a directory may, in addition to having access rights commensurate with an administrator (i.e., viewing and editing a directory, provision and deleted read-only users) also delete the directory from the system. In addition, an owner of a directory may also provision as well as delete administrators of directories.

An operator to whom the read-only user, administrator, and/or owner is connected is provided at least the same privileges with respect to the directory as the user to whom the operator is attached. Thus, if the operator is connected to a "read-only" user, the operator may only view the directory but not change it. On the other hand, if the operator is connected to an owner, the operator has full capability with respect to the directory. An operator has additional access rights. These additional rights include changing web passwords if the caller has forgotten his or hers. Also, if a caller has changed telephone numbers, an operator can change the association of a private directory from the old telephone number to the new telephone number. This situation is frequently encountered when subscribers change wireless services. The operator also performs the function of provisioning the caller initially. When a caller seeks to establish a private directory initially, the caller contacts an operator. The operator confirms that carrier to which the caller subscribes has the ability to create private directories and, if so, records certain information of the caller including a password and email address to initially provision the caller on the system.

A user of the private directory system according to the present invention has great flexibility with which to create, delete, modify, administer and access its private directory (ies). Once logged onto the system, a list of existing directories to which the user has access are displayed. The user has the option to view an existing directory, edit an existing directory (assuming the user is either an administrator or owner of the directory), delete an existing directory (assuming the users is the owner of the directory). The user also has the option to add a new directory.

A user may access the various contacts listed in a private directory for only those directories for which the particular user has access authority. Each contact comprises a record having a plurality of fields into which contact information can be entered. Contact information includes the name, address, telephone number, wireless telephone number, fax number and other information. Typical contact information in a contact record is illustrated in FIG. 11, described below. An administrator and owner may create and edit contacts. In addition, an administrator and owner may mark particular contact information private. A read-only user may only access and search for non-private contact information.

In addition, the user is able to navigate through the private directory system. A plurality of navigation buttons are provided to the subscriber to enable the subscriber to link to other web pages in the system. For example, a "Help" button links a user to a GUI that contains help information about that current GUI. A "Logout" button allows the user to log out of a private directory database and return to the carrier's web site. The "Account Info" button allows a user to link to a GUI where a user may update their account information (described below). A navigation heading ("My Directories" in this GUI) is located below the navigation buttons.

Access to the private database directories is provided to users, administrators, owners and operators, with the required access rights, through a user interface application or web browser interface. The web browser interface is usually either accessed by an operator via a private network or subscriber via the internet. The web browser interface utilizes a number of graphical user interfaces (GUIs), which may be a series of linked web pages, through which a user (assuming the user has the appropriate level of access) may create, delete, modify and/or access the private directories. The user interfaces may be implemented in HTML, JAVA, C++, Visual Basic or any other language appropriate for user interface development. An example of a set of graphical user interfaces implementing the present invention are illustrated in FIGS. 2–16. While this set is illustrative of the present invention, it is understood that the invention is not limited to the graphical user interfaces herein disclosed. Various changes, substitutions and modifications may be made thereto by those skilled in the art without departing from the spirit or scope of the invention.

Once a user has logged into a private directory database to which they have access, he is present with an interface similar to FIG. 2. The heading indicates where the current GUI is located in a series of nested GUIs. The user may click on the appropriate navigation heading to return to that heading's GUI. A table containing multiple columns is provided under the navigation heading. The columns may include the name of each directory, the owner of each directory, the access rights (Permission) that the user has for each directory, a view/edit column which indicates what actions the user is entitled to take for each directory and a column indicating whether a user is entitled to delete any particular directory. The "Edit" button allows the user to link to a GUI where they may edit and/or view a particular directory, whereas the "View" button allows the user to link to a GUI where they may only view a particular directory. The "Delete" button allows the user to delete that particular directory. Finally the "New Directory" button allows the user to link to a GUI where they may create a new directory.

FIG. 3 illustrates a second graphical user interface of the present invention. This GUI is displayed when a user attempts to log into a private directory database. In order to log in, the user supplies a mobile phone number, user name (if a special alpha numeric user name has been issued to them by a directory owner for administrative purposes), a Mobile Identification Number (MIN) or the like, and a password. When a wireless subscriber calls directory assistance to access the private directory database system via an operator, advantageously the operator may automatically be provided with the callers MIN and therefore would only require a password from the caller (the dial-in procedure is discussed below). The user of the GUI then clicks on the "Login" button which validates the user and determines their permissions and directory associations. If the user has logged in via the internet, all subsequent web pages may be provided via a Secure Sockets Layer (SSL) connection.

Figure 4:
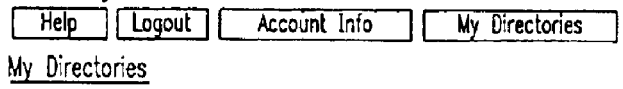
FIG. 4 illustrates a third graphical user interface of the present invention.

FIG. 4 illustrates a third graphical user interface of the present invention. This GUI is similar to the central frame illustrated in FIG. 2. This GUI displays a list of directories associated with the user. Typically, for a personal directory account the user will have just a single directory, of which they will be the owner. A user may create additional directories for his/her own use by clicking on the "New Directory" button, described above. For corporate directories, there may be multiple directories defined and the user may have owner, administrator or read-only access to a particular directory. If the user is a read-only user of a directory, the "View" button is displayed. If the user is an administrator of a directory, the "Edit" button is displayed. If the user is the directory owner, both the "Edit" and the "Delete" button are displayed.

Figure 5:
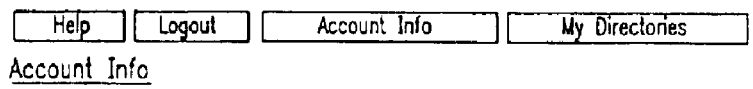
FIG. 5 illustrates a fourth graphical user interface of the present invention.

FIG. 5 illustrates a fourth graphical user interface of the present invention. This figure illustrates the "Account Info"

GUI, which is linked to the "Account Info" link on the "My Directories" GUI illustrated in FIGS. 2 and 4. This GUI allows the subscriber to update their account information such as their name and password. The user cannot change their MIN from this screen. This function can only be performed by an operator. If an operator is accessing the GUI, the MIN and user name fields may be edited.

FIG. 6 illustrates a fifth graphical user interface of the present invention. This "Update directory information" GUI is displayed when the user clicks on the "New Directory" button on the "My Directory" GUI illustrated in FIGS. 2 and 4. The user is prompted to supply a directory name. The user may also check a box if they would like the contact numbers, in this new directory, to be kept private. If checked, all numbers added to contacts of this directory are marked as private, which means that an authorized subscriber to this directory can be connected to persons in the directory by an operator, but will not be provided with the number dialed. The user may also create a directory specific password, which if supplied, must be furnished by authorized administrators before they can edit the new directory. Such a password should preferably be different from the administrator's own personal password, for security reasons. The last edit time and person who last edited the directory are also displayed. A "Change Owner" button links the user to a GUI where the user can change the owner of the directory, i.e. if the user is creating the new directory for someone else (see FIG. 9). Finally clicking on the "Save" button will save the new directory details.

FIG. 7 illustrates a sixth graphical user interface of the present invention. This "Directory information" GUI illustrates the GUI the user will link to when clicking on the "View" button next to a directory name on the "My Directories" GUI illustrated in FIGS. 2 and 4. As the user has read-only access rights, they can only view the directory information, but may not edit the information. In an alternate embodiment, this GUI may also display details regarding the last edit time, last edited by, and whether the contact numbers are private or not (not shown).

FIG. 8 illustrates a seventh graphical user interface of the present invention. This GUI illustrates the "Directory Edit" GUI. This GUI is displayed when an administrator or owner of the directory clicks on the "Edit" button in the "My Directory" GUI illustrated in FIGS. 2 and 4. This page has three regions, namely "Contacts", "Subscribers" and "Update directory information". The "Contacts" region is where a user can search for and display contacts within a directory. A user can search by first name and/or by last name, by entering the name and clicking on the "Search" button. The user can also click on the "View All" button to display all the contacts in the directory. The results of either operation are displayed on the "Edit Directory—Contact Select" GUI illustrated in FIG. 10. A user may also click on the "New" button to add a new contact to the directory (see FIG. 11).

The "Subscribers" region is where a user can search for and display authorized subscribers to this directory (i.e. who has access to use/edit this directory). A user can either search by subscriber name or MIN. A user may also view all the subscribers by clicking on the "View All" button. The results are displayed on the "Edit Directory—Subscriber Select" GUI illustrated in FIG. 12. Again, a user may click on the "New" button to add a new subscriber to the directory. The "Update Directory Information" region is where a user can change the directory name, mark all numbers as private and supply a directory specific password, similar to that illustrated in FIG. 6. The user may save the changes by clicking on the "Save" button. If the user is the directory owner, the "Change Owner" button is display which allows the user to transfer the ownership of the directory to another subscriber with access to that directory (see FIG. 9).

FIG. 9 illustrates a eighth graphical user interface of the present invention. This GUI illustrates the "Transfer directory ownership" GUI that one would link to, from clicking on the "Change Owner" button illustrated in FIGS. 6 and 8. To change ownership to another subscriber, the new subscriber's MIN is entered and the "Continue" button is clicked. The new owner must already be an administrator of the directory. The action may be canceled by clicking on the "Cancel" button.

FIG. 10 illustrates a ninth graphical user interface of the present invention. This GUI displays the results of a contact search from the "Directory Edit" GUI illustrated in FIG. 8. This GUI is split into two regions. A first "Contacts" region is the same as the "Contacts" region illustrated in FIG. 8 above. The second region features a table listing a number of records each including the name, home, business and mobile telephone numbers of each contact. Each name is hyperlinked, so when the user clicks on a name, either the "View Contact" or the "Edit Contact" (FIG. 11) GUIs are displayed (depending on whether the user is a read-only user or not). A user may also click on the "New" button to add a new contact to the directory. The "New" button is not seen in this figure but is displayed at the end of the directory table which can be accessed by clicking on the "Next" button which displays records 11 to 16. If the user has the access rights, they may also delete a contact record by clicking on the "Delete" button adjacent each record. A deleted record will not be deleted from the database immediately, but is instead shown in grayed-out text (as shown for "Monty Burns"). This allows the user to undelete the contact record within a fixed period of time.

FIG. 11 illustrates a tenth graphical user interface of the present invention. When a user, with editing access rights, clicks on a contact's name (FIG. 10), the user is hyperlinked to this GUI. This GUI will also be displayed when a new contact is added to the directory by clicking on the "New" button illustrated in FIGS. 8 and 10. The new contact GUI would look the same as this GUI but all the fields would be blank. The user may typically edit any of the fields. Furthermore the user can check a box next to any number, to make that particular number private, as described above. The edited/updated GUI may then be saved by clicking on the "Save" button. The "Save & Add" button allows a user to save the updated record and add another record. The "Cancel" button allows the user to cancel the current update.

FIG. 12 illustrates an eleventh graphical user interface of the present invention. This GUI displays the result of a subscriber search from the "Edit Directory" GUI, illustrated in FIG. 8. A first "Subscribers" region is the same as the "Subscribers" region illustrated in FIG. 8 above. The second region features a table with a number of records each including mobile phone number, name and access level rights. Each access level hyperlinks to a GUI where the user can change the access level/rights for that particular subscriber (see FIG. 14). The user can also delete a subscriber by clicking on the "Delete" button, This does not delete the subscriber from the database, but simply disassociates him or her from this directory. The user can also associate other subscribers to this directory by clicking on the "New" button, at which point the "New Subscriber" GUI will be displayed, as illustrated in FIG. 13.

FIG. 13 illustrates a twelfth graphical user interface of the present invention. This GUI is for creating a new subscriber, and is linked to, from the "New" button displayed in FIG. 12. The MIN of the subscriber may be entered into the empty field and the "Continue" or "Cancel" buttons clicked to either enter a new subscriber or cancel the current operation. If the subscriber does not already exist in the database, the user will be prompted to supply their details, such as the subscribers first name, last name and access level. This is displayed in FIG. 14, which illustrates a thirteenth graphical user interface of the present invention.

FIG. 15 illustrates a fourteenth graphical user interface of the present invention. This GUI is displayed to the user when the user logs out of the system by clicking on the "Logout" button. A login hyperlink is provided to return to the Login GUI (see FIG. 3).

The operator may automatically dial a contact number by clicking on a phone icon displayed next to each number in any of the above-mentioned GUIs (not shown). This function also allows operators to connect to numbers that have recently been added to the database.

Figure 16:
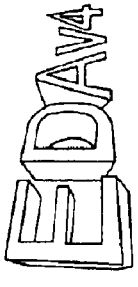
FIG. 16 illustrates a graphical user interface of another embodiment of the present invention.

FIG. 16 illustrates a graphical user interface of another embodiment of the present invention. Operators in the call centers may have access to both the web browser interface discussed in FIGS. 2 to 15, or may utilize another interface as illustrated in the GUI displayed in FIG. 16. If the operator utilizes the web browser interface, the GUIs may have less graphics, and some additional functionality to that described above, in order to allow an operator to make provision for adding new subscribers, changing mobile numbers, etc. Preferably, the operator will not use the web browser interface for searching the private directory databases and connecting callers to numbers listed therein. The operator, preferably will utilize the interface of FIG. 16, wherein a search is conducted by various search criteria, including name, company, city, street, state, department or number type. Search results are displayed in the results panel at the bottom of the GUI. The operator has the ability when displaying a detailed result of a search to automatically dial a call without dialing the number or reciting the number to the caller. Furthermore, the operator will inherit the access rights of the caller they are talking to, i.e. if the caller has privileges to edit a directory, then so will the operator. The operator has additional access rights as described above.

A border may be added to any border of a web page (top, bottom, right, left). The border is advantageously customized to an individual corporate customer's/sponsor's requirements thereby branding, promoting and/or advertising the customer/sponsor. An application server determines which outside border to apply to the web page. Such a decision may be based upon the last web page that the subscriber came from to reach the private database. This is accomplished by adding a link from the corporate customer's web site to the login page (described below). The login page is hosted by the directory assistance server. Alternatively, the decision as to which outside border to apply may be based upon the identification of the user obtained, for example, from the user's MIN. This information may be obtained at login. Referring to FIG. 2, a perimeter frame or border is provided around at least part of the perimeter of each GUI, and a central frame, within the perimeter frame, containing the private directory database GUI interfaces according to the present invention. The perimeter frame may be customized to an individual carrier's requirements, such as for example inserting the carrier's logo and/or links into the frame. The GUIs described in FIGS. 3–16 are illustrative of the central frame content. It is understood that each GUI may include the perimeter frame displayed in FIG. 2. These GUIs may be hosted by a central server (described in relation to FIGS. 17A and 17B) or by a number of servers dispersed throughout the WAN. In the case where a wireless subscriber is utilizing the web browser interface, the database server determines which perimeter frame to apply to each GUI, based upon the web page from which the subscriber is linked. An operator's interface may not include the perimeter frame. A carrier may therefore add a link from their own web site to the GUI Login page of this interface.

With reference to FIGS. 17A and 17B, a directory assistance center 100 according to a preferred embodiment of the present invention includes a switching matrix platform 114 connected to one or more external T1 voice connections 112 and one or more corresponding T1 data connections 113 from caller networks. Switching matrix platform 114 is also connected via T1 communication links to a channel bank 116 for coupling to a plurality of operator telephones 118. It should be appreciated that other transport methods are supported such as voice over IP.

Each operator is equipped with a terminal 120 that includes a monitor, mouse and keyboard with associated dialing pad. The operator terminals are coupled over a data network 124 to a database server 126, allowing an operator to access the data in database server 126 through the operator terminals 120. The database server 126 contains standard telephone directory information.

The data network 124 further connects to a voice response unit (VRU) 130 and a switching matrix host computer 128 (also known as a PBX host), which in turn is connected to the switching matrix platform 114 by switch data link 122. The data network 124 may, but not necessarily, also further connect to a private directory database 136 and a caller profile database 134. The caller profile database 134 stores detailed information about a subscriber. Such details may include the subscribers name, contact details, most recent calls made, past logged activity, etc.

In one embodiment, the VRU 130, database server 126, and switching matrix host 128 have redundant systems (not shown), which can operate as either back-up systems in the event of primary system failure, or provide load-sharing in a master-slave relationship with the primary system.

The data network 124 consists of, but is not limited to, a local area network (LAN) 127, best seen in FIG. 17B. The LAN 127 may connect to a plurality of other similar remote LANs 129 to form a wide area network (WAN) 115 (reference numeral 30 in FIG. 1). The LANs 127 and 129 are connected to one another via routers or other WAN connections 125. The WAN may furthermore be connected by a frame relay connection (a telecommunication service designed for cost-efficient data transmission for intermittent traffic between local area networks (LANs) and between end-points in a WAN). It should be appreciated by one skilled in the art, that databases 126, 134 and 136 may be located at each LAN or at a single central LAN.

A subscriber's mobile or wireless telephone, computers, PDAs or other telecommunication devices 144 communicates with a wireless telephone network 146 which in turn is connected to a carrier network node 142 and carrier switching center 140.

The T1 voice connections 112, or voice links, provide connection between the directory assistance center's switching matrix platform 114 and the carrier's switching center 140, through which incoming directory assistance calls are received. The T1 voice connections 112 further provide connection to the network over which outgoing calls are placed (which network may be different than that used for incoming traffic). Similarly, T1 data connections 113, or data links, provide a signaling connection between the directory assistance center's node and the carrier's SS7 network node 142, through which incoming and outgoing signaling messages are transmitted. (Common Channel Signaling System No. 7 (SS7) is a global standard for telecommunications defined by the International Telecommunication Union (ITU) Telecommunication Standardization Sector (ITU-T). The standard defines the procedures and protocol by which network elements in the public switched telephone network (PSTN) exchange information over a digital signaling network to effect wireless and wireline call setup, routing and control). The directory assistance node is contained within the switching matrix platform 114, but one with skill in the art will appreciate that the directory assistance node could also be a physically distinct component. If the outgoing call is being placed over a different network than that on which the incoming call was received, a second data connection to the outgoing network will be established.

The switching matrix platform 114 is described in detail in currently copending U.S. patent application Ser. No. 08/816,921, which is incorporated herein by reference. In general, referring to FIGS. 18 and 19. operation of switching matrix platform 114 is governed by computer-readable instructions stored and executed on switch matrix host computer 128. In one embodiment of the invention, switching matrix platform 114 is an Excel LNX 2000 and switch data link 122 is a 38.4 kb serial link; in another embodiment, switch data link is an Ethernet link. Switching matrix platform 114 includes expandable central processing unit ("EXCPU") 304 and/or matrix central processing unit ("MXCPU") 304. EXCPU/MXCPU 304 serves as an interface for switching matrix platform 114 to switching matrix host computer 128 (via switch data link 122). EXCPU/MXCPU 304 and other components of switching matrix platform 114 communicate through shared communication path 302, commonly called a "midplane." In the currently-described embodiment, midplane 302 utilizes a time division multiplexing ("TDM") method of sharing a common pathway. Thus, a plurality of data (other than SS7 messaging) and/or voice streams can be interlaced onto the single path, separated by time.

Another board-level component of switching matrix platform 114 is multi-frequency digital signal processor ("MFDSP") unit 310, which includes four single in-line memory module ("SIMM") packagings. Each SIMM packaging is comprised of four DSP arrays. Each DSP array is composed of multiple, illustratively sixteen, programmable DSPs. The DSPs can be programmed or reprogrammed to function as, among other things, call progress analyzers ("CPA"), call progress generators ("CPG"), multi-frequency ("MF") receivers or transmitters, dual-tone multi-frequency ("DTMF") receivers or transmitters, or conference units, depending upon the demand placed on directory assistance center 100 (FIG. 17A) and switching matrix platform 114 for each corresponding function.

It will be recognized by one skilled in the art that a variety of types of, or even multiple instances of, switching matrix platform 114 may be incorporated into a telephone network or directory assistance center 100 without exceeding the scope of this invention. In the preferred embodiment, the switching matrix platform supports digital T1 telephone circuits and includes digital signal processing circuitry which provides the requisite conference capability (described below), SS7 message generation/detection capabilities, and dual tone multi frequency (DTMF) and multi frequency (MF) tone generation/detection capabilities.

With respect to the SS7 functionality, the switching matrix platform acts as a signaling node, also known as a service switching point (SSP), as discussed above.

The voice response unit (VRU) 130 is incorporated into the system to play the constantly repeated parts of an operator's speech, namely the various greetings and signoffs (or closings), and the caller's desired telephone number where requested. Not only does this system provide a voice-saving and monotony-relief function for the operators, it performs a "branding" function (i.e. the pre-recorded messages incorporate the name of the telephone company through which the caller was routed to the directory assistance service), and it also reduces the amount of time an operator is actually connected to a caller. The VRU may also contain a voice recognition system for receiving verbal input from a party connected to the VRU.

Figure 18:
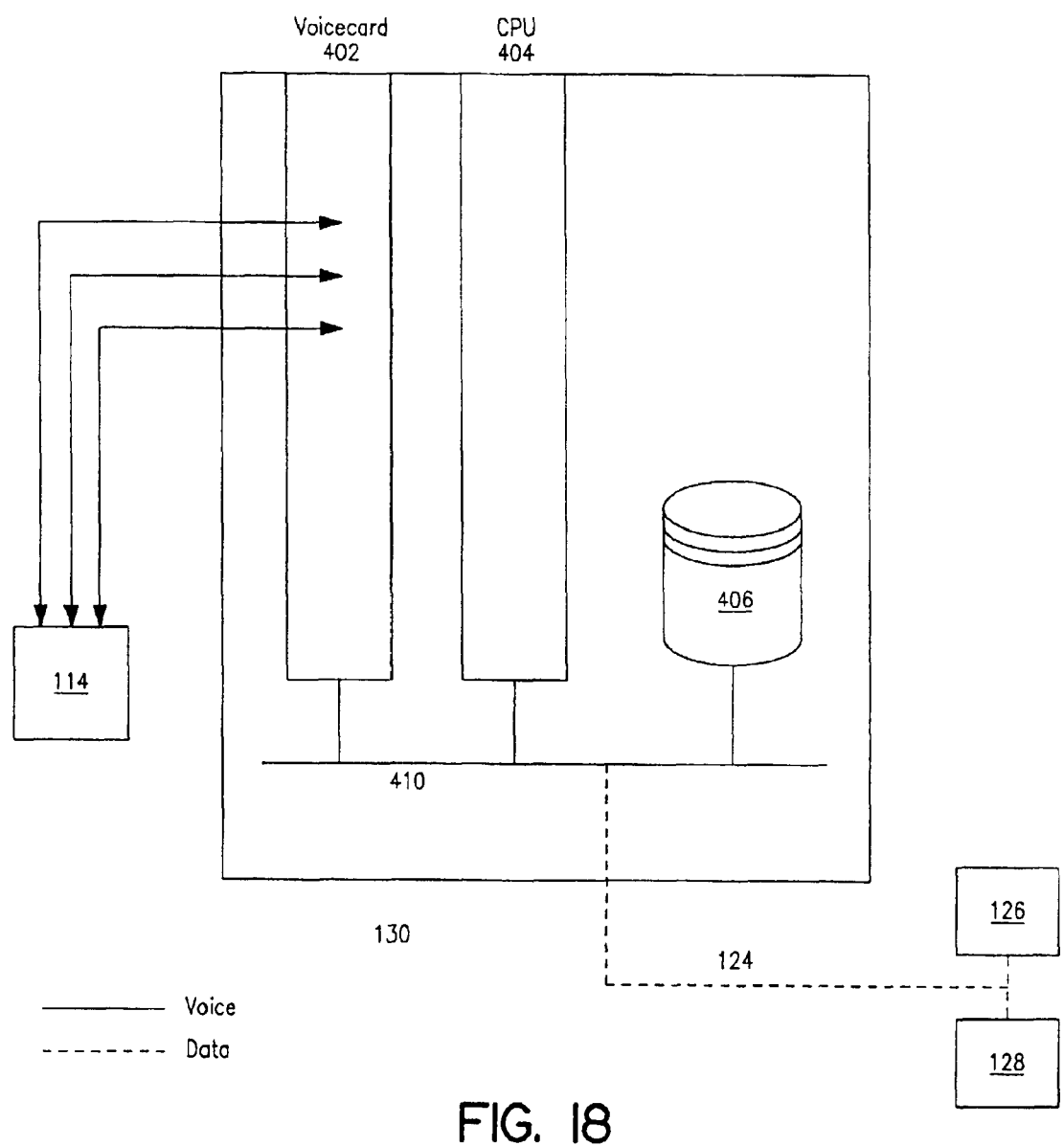
FIG. 18 provides a detailed view of a voice server used in an embodiment of the invention.
Figure 19:
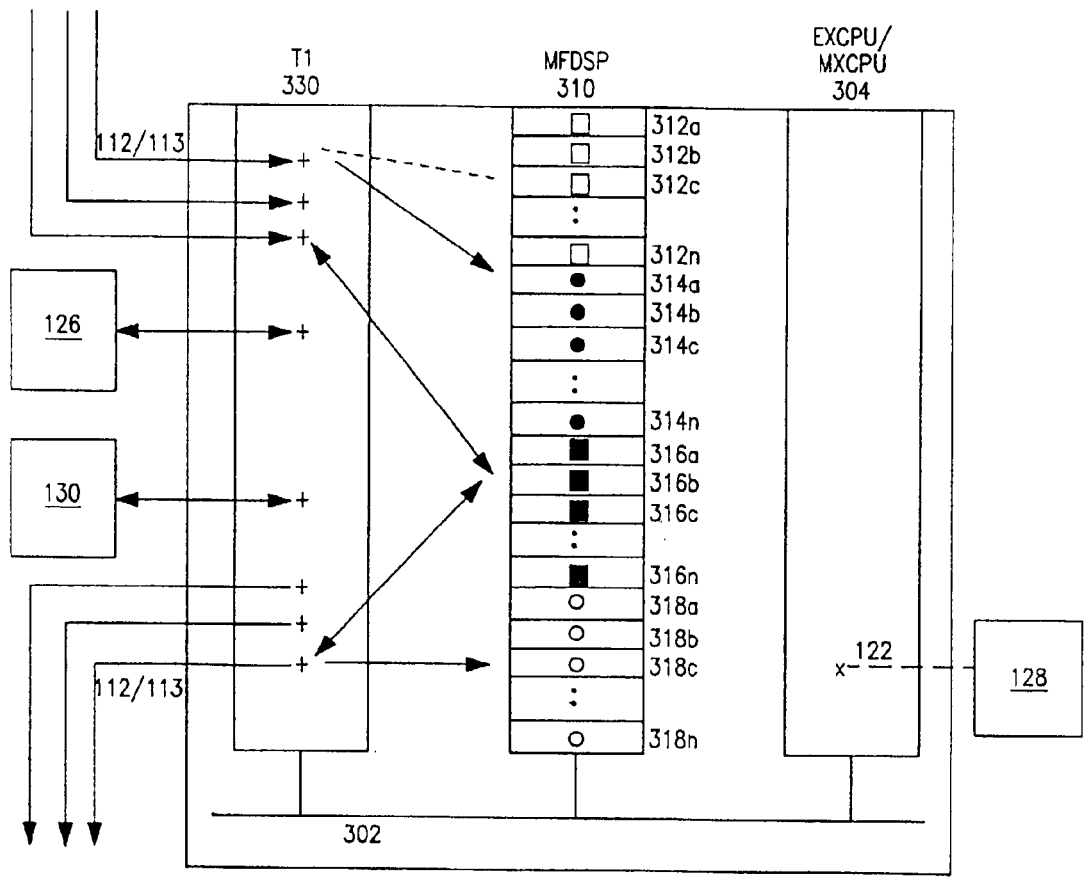
FIG. 19 provides a detailed view of a switching matrix platform used in an embodiment of the invention.

VRU 130 is connected via the data network 124 to the switching matrix host 128 (to which it acts as a slave processor) and via one or more T1 spans to the switching matrix platform 114 itself. Each VRU 130. when more than one is employed in directory assistance center 100, connects to switching matrix platform 114 via a separate voice server link. VRU 130 consists of a general purpose computer plus one or more voice cards (a first voice card 402 is depicted in FIG. 18), which serve as the interface between VRU 130 and the T1 span to switching matrix platform 114. Voice card 402 monitors and controls communications over the T1 span; its capabilities include telephone tone detection and generation, voice recording and playback, and call progress analysis. Therefore, very similar to switching matrix platform 114, VRU 130 is capable of detecting connection status conditions, detecting caller keypresses, and generating tones. Although the figures depict VRU 130 distinct from database server 126, in alternative embodiments they are coterminous.

VRU 130 also includes typical computer components such as central processing unit 404, data storage unit 406, and bus 410 for transferring voice and data signals. VRU 130 may also contain a voice recognition subsystem (not shown) for receiving verbal input from a party connected to the voice server.

At appropriate stages in a call progression, the switching matrix host 128 initiates a voice path between the VRU and the switching matrix platform such that the caller, or the caller and the operator, are able to hear whatever pre-recorded speech is played on that circuit by the VRU. The switching matrix host 128 then instructs the VRU, via the data network, what type of message to play, passing data parameters that enable the VRU to locate the message appropriate to the call state, the service-providing telephone company, and the operator. The recording density used is high enough to provide a good enough quality of message playback that most users of the system should be unaware they are listening to a recording.

The databases 126, 134 and 136 provide operators with the means to search for a caller's desired party, and determine the appropriate contact details. In the preferred embodiment, the databases provide the capability to search not just by name and address, but also by type of goods/services and/or geographical region, or by any other attribute in the caller record, including phone number. The databases may be SQL relational databases. SQL (Structured Query Language) is a standard interactive and programming language for getting information from and updating a database. Queries take the form of a command language that lets you select, insert, update, find out the location of data, and so forth. Databases 134 and 136 may also be located at a centralized location, as mentioned above. Databases 126, 134 and 136 are separated for ease of explanation, but may be incorporated into a single database.

Typically, search results are present in alphabetical order. However, to promote variability in the presentation of data, the results of the database search may be presented on the operator's terminal 120 without having been alphabetized prior to display, but rather are presented in the order located by the database search engine.

The database software itself is conventional. The presently preferred best mode is to use a relational database, such as is available from Sybase. However, much simpler software can alternatively be used, such as DBase 4.

Method of Operation

Callers of a particular telephone company simply dial the access digits established for directory assistance by that company. Examples of typical access digits are "411", "*555" and "555-1212." The participating telephone company's own switching system will then reroute the call to the directory assistance service center 100 (via a T1 channel), where it appears as an incoming call. In a SS7 system, the telephone company or wireless carrier transmits call setup information associated with the call to the directory assistance center from the telephone company's signaling network node (also via a T1 channel) to the directory assistance center. For purposes of illustration, a SS7 call initiation procedure will be described, which is utilized not only in routing a caller's call to the directory assistance center, but also by the directory assistance center in connecting the caller to the desired number.

The phone company (as the originating SSP) first transmits an Initial Address Message (IAM) to reserve an idle trunk circuit from the originating switch to the destination switch (in this case, switching matrix platform 114). The destination switch examines the dialed number, determines that it serves the called party and that the line is available for ringing. The destination switch then transmits an Address Complete Message (ACM) to the originating switch to indicate that the remote end of the trunk has been reserved. The destination switch rings the called party line and sends a ringing tone over the trunk to the originating switch. When the originating switch receives the ACM, it connects the calling party's line to the trunk to complete the voice circuit from the calling party to the called party. The calling party hears the ringing tone on the voice trunk. When the called party picks up the phone, the destination switch terminates the ringing tone and transmits an Answer Message (ANM) to the originating switch. The originating switch then verifies that the calling party's line is connected to the reserved trunk and, if so, initiates billing.

During the course of the call, if the calling party hangs up first, the originating switch sends a Release Message (REL) to release the trunk circuit between the switches. Upon receiving the REL, the destination switch disconnects the trunk from the called party's line, sets the trunk state to idle, and transmits a Release Complete Message (RLC) to the originating switch to acknowledge the remote end of the trunk circuit. When the originating switch receives the RLC, it terminates the billing cycle and sets the trunk state to idle in preparation for the next call. On the other hand, if the called party hangs up first, or if the line is busy, the destination switch sends an REL to the originating switch indicating the release cause, such as a normal release or busy condition. When the originating switch generates the RLC, it terminates the billing cycle and sets the trunk to idle.

Automatic Call Distribution (ACD) logic is used to queue (if necessary) and distribute calls to operators in the order in which they are received, and such that the call traffic is distributed evenly among the operators. In other embodiments, other distribution logic schemes are utilized, such as Skills-Based Routing or a priority scheme for preferred callers. The queue is maintained by switching matrix host 128.

When a call is connected to an operator, switching matrix host 128 directs the VRU 130 (also conferenced into the call) to play a greeting message, using a message prerecorded by the connected operator. Both the operator and the caller hear the message, which incorporates the name of the service or company to which the caller is a subscriber (in other words, the call is "branded"). The message ends with a prompt, thus cuing the caller to volunteer what information they are seeking.

When the automated greeting is complete, the VRU is disconnected and the operator and the caller are left connected by a 2-way speech path. From this point, the caller is interacting with a live operator. In the event that the VRU is non-functional (for whatever reason), the incoming call is connected to the operator and a short "trill," or "zip" tone is played to indicate that a caller is on the line. (Note that once operators are logged in to the system, they wear headsets, and have their telephones 118 permanently off-hook. Their telephones do not ring when a call is presented.) The operator then speaks a greeting and prompt in real time, instead of the VRU playing a message.

Private Directory Database

Figure 20A:
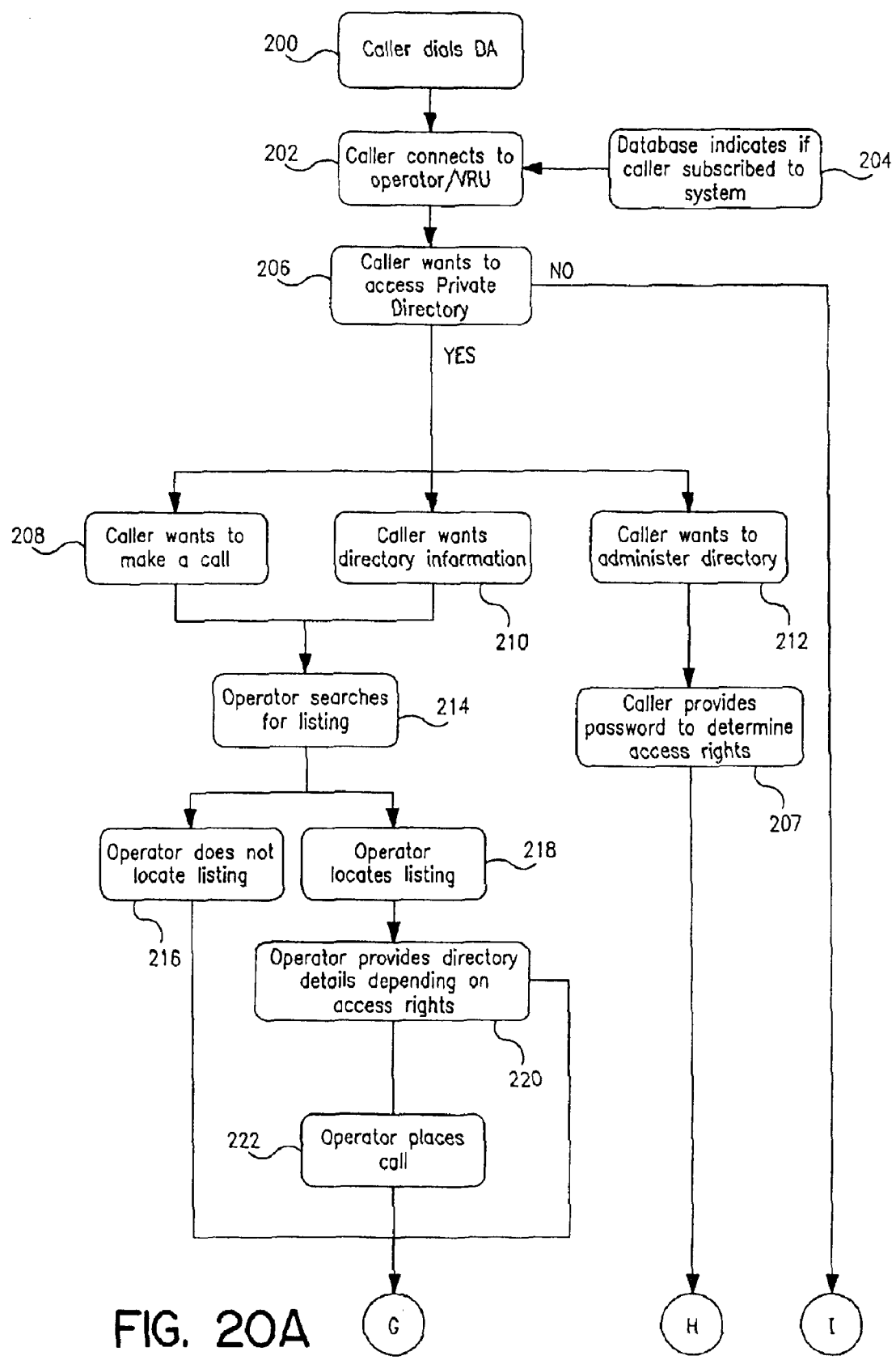
FIGS. 20A and 20B are flow charts depicting an embodiment of the method by which enhanced telephonic directory assistance is provided to a caller.
Figure 20B:
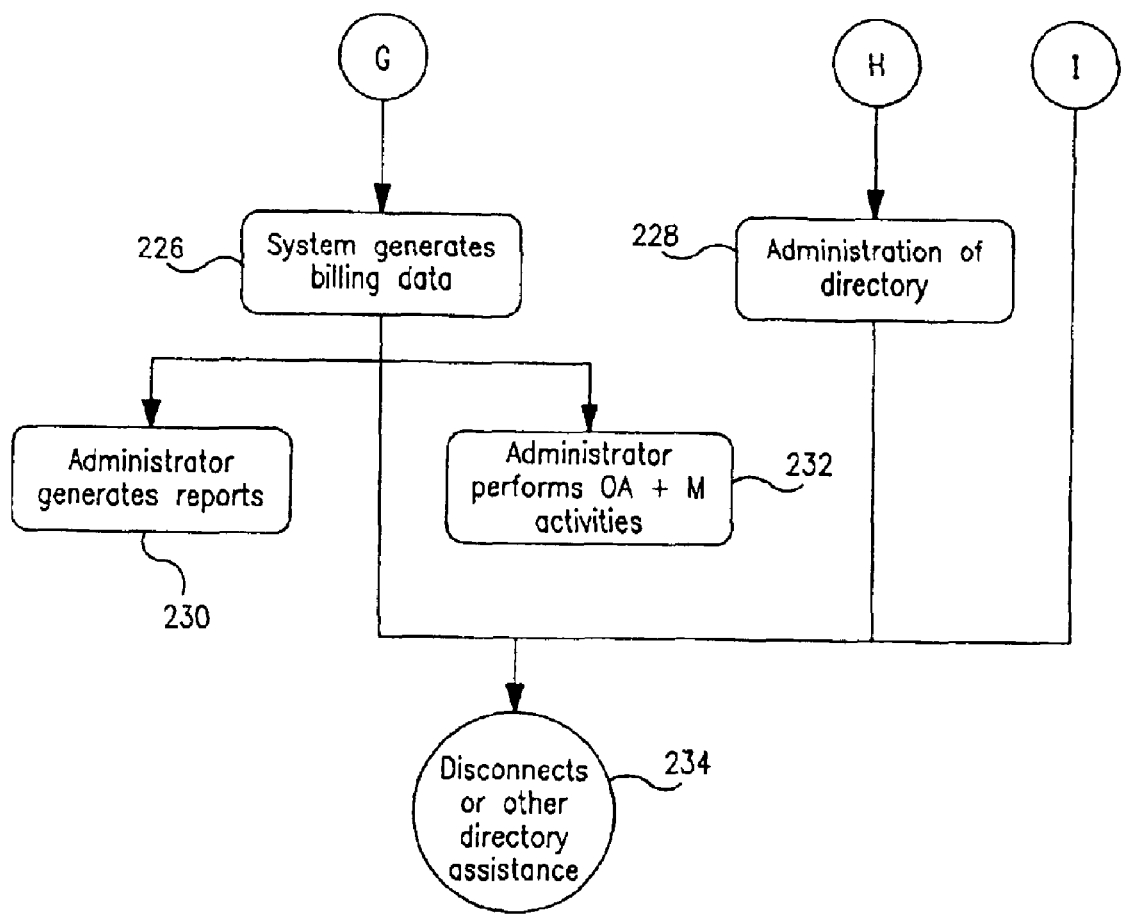

FIGS. 20A and 20B are flow charts depicting an embodiment of the method by which an enhanced directory assistance service is provided to a caller. A caller dials directory assistance 200. The call is connected to a directory assistance service operator or a voice response unit (VRU) 202. The system automatically indicates that the caller is subscribed to one or more private directories. The system furthermore automatically provides the operator with the callers mobile identification number (MIN) and details of the caller's past activity. Depending on the caller's access rights, the caller may or may not be able to access a particular private directory. A caller may also not want to access a directory 206, but rather requires other directory assistance.

A caller has the option of making a call 208, obtaining directory information 210, or administering 212 a particular private directory.

Should the caller select to make a call 208, or require private directory information 210, the operator will search the private directory 214 for a caller's desired party. The operator may 218 or may not 216 locate the desired party. If the operator locates the desired party 218, the operator may provide the caller with the desired party's contact details depending on the callers access rights 220. The operator may then place the call 222, disconnect the caller or provide other services 234.

Should the caller select to administer the private directory, 212, the operator prompts the caller for a password 207 and verify the caller's access rights. Upon verification, the operator will administer the private directory 228 by following the caller's verbal commands. Again access to administer the private directory depends on the caller's access rights. The caller may therefore retrieve, edit, store or delete any details in the private directory, if the caller has the authority to do so.

The system may generate billing data 226 to be used to bill the client, generate reports 230 for a system administrator activities 232.

A system administrator may also administer or maintain the system via a secure WAN/LAN connection, 121 of FIG.

17B and as described in FIGS. 2 to 16, or direct dial-up computer connection (not shown).

A callers access rights are determined by the owner of a private directory. Access rights may have many levels. For example, one may have access to a particular private directory as a whole, access to only particular groups or subgroups of information within the directory, or one may only be able to have calls placed for them without the operator ever divulging a party's contact details.

The system may further do away with a live operator and may be voice or "touch tone signal" (DTMF) driven.

The caller profile database 134 of FIG. 17A may include an updated list of most recently and/or frequently called numbers. The system may also provide for data interchange between a private directory and various Personal Information Management software and/or devices. The present invention is capable of achieving full, two-way synchronization between private directories and PIM products. Another application may include a dialer for connecting a caller after looking up one of the caller's numbers over the Internet.

According to the present invention a private directory may be administered in a number of ways. A caller may telephone directory assistance and ask the operator to administer the private directory database by following the caller's instructions. (System will advantageously bill the subscriber for this operator activity.) The wireless subscriber may directly administer a private directory by direct dial-up to the applicable system server or through the wireless subscriber's LAN at the wireless subscriber's place of business. Preferably the wireless subscriber may administer the directory database via the internet, using the first interface described in relation to FIGS. 2 to 16. The wireless subscriber may also synchronize his/her personal digital assistant (PDA) with a private directory using any of the above-mentioned methods. Similarly, corporate directory products, such as Lotus Notes, may be synchronized with private directories according to the present invention.

Additional Features

Data extracted from the system may be used for internal reports or for external customer billing.

The system and method of the present invention has been described. Clearly, there are still other alternatives and equivalents that are within the spirit and intent of the invention and will occur to a person skilled in the art. Accordingly, it is intended that the scope of the invention be limited only by the claims that follows and all equivalents thereto.

What we claim:

1. A method for providing information assistance, comprising:

maintaining at least one record which contains contact information concerning a party, the contact information being provided for the record by a user having a first access right with respect to the record, the user granting a second access right with respect to the record to one or more selected users and selecting an option not to disclose the contact information to the selected users;

storing identifying information concerning the selected users and the selected status of the option in association with the record;

receiving a voice communication from a caller and identifying information concerning the caller, the voice communication including a request for obtaining the contact information concerning the party in the record;

retrieving the stored selected status of the option associated with the record;

determining, based on the received identifying information and the stored identifying information, whether the caller has the second access right with respect to the record; and offering to establish a voice connection between the caller and the party based on the contact information without disclosing the contact information to the caller when it is determined that the caller has the second access right with respect to the record.

2. The method of claim 1 wherein the data communication includes a communication via the Internet.

3. The method of claim 1 wherein the voice communication includes a telephone communication.

4. The method of claim 1 wherein the contact information includes a telephone number associated with the party.

5. The method of claim 1 wherein the first access right includes right to edit content of the record.

6. The method of claim 1 wherein the second access right includes right to read content of the record only.

7. The method of claim 1 wherein the party is different from the user having the first access right.

8. A method for providing information assistance, comprising:

maintaining at least one record containing contact information concerning a party, the contact information being provided for the record by a user having a first access right with respect to the record, the user granting a second access right with respect to the record to one or more selected users and selecting an option to deny access to the contact information by the selected users;

storing identifying information concerning the selected users and the selected status of the option in association with the record;

receiving signals in establishing a communication connection initiated by an initiator using a communication apparatus, and a request from the initiator for accessing the contact information concerning the party;

deriving from the signals an identifier;

retrieving the record based on the identifier, and the selected status of the option stored in association therewith;

determining whether the initiator has the second access right with respect to the record based on the identifier and the stored identifying information; and offering to connect the initiator to the party based on the contact information without disclosing the contact information to the initiator when it is determined that the initiator has the second access right with respect to the record.

9. The method of claim 8 wherein the communication apparatus includes a telephonic device.

10. The method of claim 9 wherein the identifier includes an automatic number identification (ANI).

11. The method of claim 9 wherein the communication connection includes a telephone connection.

12. The method of claim 8 wherein the contact information includes a telephone number associated with the party.

13. The method of claim 8 wherein the first access right includes right to edit content of the record.

14. The method of claim 8 wherein the second access right includes right to read content of the record only.

15. The method of claim 8 wherein the party is different from the user having the first access right.

16. A system for providing information assistance, comprising:

a mechanism for maintaining at least one record which contains contact information concerning a party, the contact information being provided for the record by a user having a first access right with respect to the record, the user granting a second access right with respect to the record to one or more selected users and selecting an option not to disclose the contact information to the selected users;

storage for storing identifying information concerning the selected users and the selected status of the option in association with the record;

an interface for receiving a voice communication from a caller and identifying information concerning the caller, the voice communication including a request for obtaining the contact information concerning the party in the record, the stored selected status of the option being retrieved from the storage; and a device for determining, based on the received identifying information and the stored identifying information, whether the caller has the second access right with respect to the record, an establishment of a voice connection between the caller and the party based on the contact information being offered without disclosing the contact information to the caller when it is determined that the caller has the second access right with respect to the record.

17. The system of claim 16 wherein the data communication includes a communication via the Internet.

18. The system of claim 16 wherein the voice communication includes a telephone communication.

19. The system of claim 16 wherein the contact information includes a telephone number associated with the party.

20. The system of claim 16 wherein the first access right includes right to edit content of the record.

21. The system of claim 16 wherein the second access right includes right to read content of the record only.

22. The system of claim 16 wherein the party is different from the user having the first access right.

* * * * *